(12) United States Patent
Matsusaka

(10) Patent No.: US 7,298,784 B2
(45) Date of Patent: Nov. 20, 2007

(54) RECEPTION METHOD, RECEPTION APPARATUS AND WIRELESS TRANSMISSION SYSTEM USING ADAPTIVE MODULATION SCHEME

(75) Inventor: Hiromi Matsusaka, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 657 days.

(21) Appl. No.: 10/644,845

(22) Filed: Aug. 21, 2003

(65) Prior Publication Data
US 2004/0081260 A1 Apr. 29, 2004

(30) Foreign Application Priority Data
Oct. 29, 2002 (JP) ............................ 2002-314954

(51) Int. Cl.
*H04L 27/00* (2006.01)
(52) U.S. Cl. .................. 375/259; 375/224; 375/316
(58) Field of Classification Search ............ 375/259, 375/224, 316, 340; 370/241, 252
See application file for complete search history.

(56) References Cited

U.S. PATENT DOCUMENTS

| 6,359,934 B1 | 3/2002 | Yoshida |
| 6,389,066 B1 | 5/2002 | Ejzak |
| 6,522,706 B1 * | 2/2003 | Bahai et al. ............... 375/343 |
| 6,608,868 B1 | 8/2003 | Murakami et al. |
| 6,647,098 B2 * | 11/2003 | Sakai et al. ............. 379/93.01 |
| 6,782,037 B1 * | 8/2004 | Krishnamoorthy et al. . 375/138 |
| 6,865,235 B2 * | 3/2005 | Khoini-Poorfard .......... 375/272 |
| 6,895,057 B1 * | 5/2005 | Balachandran et al. ..... 375/259 |
| 6,987,754 B2 * | 1/2006 | Shahar et al. ............... 370/349 |
| 2002/0114379 A1 * | 8/2002 | Uesugi et al. .............. 375/219 |
| 2002/0136196 A1 * | 9/2002 | Moon et al. ................ 370/347 |
| 2003/0002495 A1 * | 1/2003 | Shahar et al. ............... 370/389 |
| 2003/0012310 A1 * | 1/2003 | Nagayasu ................... 375/341 |
| 2003/0060173 A1 * | 3/2003 | Lee et al. ................... 455/103 |
| 2004/0097207 A1 * | 5/2004 | Sandaralingam ........... 455/205 |

FOREIGN PATENT DOCUMENTS

| EP | 0944200 | 9/1999 |
| JP | 9-186635 | 7/1997 |
| JP | 11-252042 | 9/1999 |
| JP | 11-275059 | 10/1999 |
| JP | 11-275164 | 10/1999 |
| JP | 2000-324081 | 11/2000 |
| JP | 2002-199033 | 7/2002 |

(Continued)

OTHER PUBLICATIONS

English Language Abstract of JP 9-186635.

(Continued)

*Primary Examiner*—Jean B. Corrielus
(74) *Attorney, Agent, or Firm*—Greenblum & Bernstein; P.L.C.

(57) ABSTRACT

A wireless transmission system which adaptively selects a plurality of modulation schemes according to variations in a propagation path characteristic, capable of estimating the modulation scheme of a received signal more easily with a substantially simple configuration. This system adds priority order to modulation schemes to be candidates for modulation scheme estimation processing, carries out estimation processing on modulation schemes one by one in descending order of priority and confirms the modulation scheme of the received signal when predetermined likelihood is obtained.

5 Claims, 9 Drawing Sheets

FOREIGN PATENT DOCUMENTS

| | | |
|---|---|---|
| WO | 02/73916 | 9/2000 |
| WO | 02/073916 | 9/2002 |

OTHER PUBLICATIONS

English Language Abstract of JP 2000-324081.
English Language Abstract of JP 11-252042.
English Language Abstract of JP 11-275059.
English Language Abstract of JP 2002-199033.
English Language Abstract of JP 11-275164.
English Language Abstract of JP 9-186635, Jul. 15, 1997.
English Language Abstract of JP 2000-324081, Nov. 24, 2000.
English Language Abstract of JP 11-252042, Sep. 17, 1999.
English Language Abstract of JP 11-275059, Oct. 8, 1999.
English Language Abstract of JP 2002-199033, Jul. 12, 2002.
English Language Abstract of JP 11-275164, Oct. 8, 1999.

* cited by examiner

| LOGICAL CHANNEL | MODULATION SCHEME |
|---|---|
| SYNCHRONIZATION CHANNEL | MODULATION SCHEME A |
| CONTROL CHANNEL | MODULATION SCHEME A |
| SPEECH CHANNEL | MODULATION SCHEME B |
| DATA CHANNEL | MODULATION SCHEME A, B, OR C<br>※VARIES DEPENDING ON CHANNEL CONDITION AS SHOWN IN TABLE BELOW<br><br>| CHANNEL CONDITION | MODULATION SCHEME |<br>\|---\|---\|<br>\| BAD | A \|<br>\| ↕ | B \|<br>\| GOOD | C \| |

FIG.4

| PREVIOUS DEMODULATION SCHEME DECISION RESULT | PREVIOUS RECEPTION QUALITY | PRIORITY PROCESSING ORDER THIS TIME |
|---|---|---|
| DEMODULATION SCHEME A | BAD | A→B→C |
| | GOOD | B→C→A |
| DEMODULATION SCHEME B | BAD | A→B→C |
| | GOOD | C→B→A |
| DEMODULATION SCHEME C | BAD | B→A→C |
| | GOOD | C→B→A |

FIG.7

| PREVIOUS DEMODULATION SCHEME DECISION RESULT | RECEPTION SIGNAL LEVEL THIS TIME | PRIORITY PROCESSING ORDER THIS TIME |
|---|---|---|
| DEMODULATION SCHEME A | LOW | A→B→C |
| | HIGH | B→C→A |
| DEMODULATION SCHEME B | LOW | A→B→C |
| | HIGH | C→B→A |
| DEMODULATION SCHEME C | LOW | B→A→C |
| | HIGH | C→B→A |

FIG.8

RECEPTION METHOD, RECEPTION APPARATUS AND WIRELESS TRANSMISSION SYSTEM USING ADAPTIVE MODULATION SCHEME

BACKGROUND OF THE INVENTION

1. Field of the Invention

The present invention relates to a reception method, reception apparatus and wireless transmission system when adaptive modulation/demodulation is carried out.

2. Description of the Related Art

There are conventional communication systems which select a wireless transmission system according to traffic of each service area, propagation environment and required service content. As conventional wireless communication systems that select this wireless transmission system, there are a low-speed adaptive modulation scheme which takes into consideration traffic, propagation environment, desired transmission speed, etc., when a channel is assigned to each user (communication terminal apparatus) and a high-speed adaptive modulation scheme which adapts its modulation scheme within the assigned range according to instantaneous variations in a propagation path to improve transmission quality.

The low-speed adaptive modulation scheme is basically intended to reduce concentration of traffic of communication systems and at the same time assign transmission bands which will meet requests from users (communication terminal apparatuses) to the greatest possible extent by providing specified quality.

Also, the high-speed adaptive modulation scheme is intended to monitor instantaneous C/Ic (power ratio of a desired signal to an interference signal: carrier to co-channel power ratio) and instantaneous delay spread and at the same time realize high throughput with high transmission quality by selecting an optimum number of modulation multi-values and symbol rate within the assigned band.

Communication systems using these schemes are easily adaptable to implementation of a large-capacity system, buffering of load on communication systems in response to dynamic variations of traffic and handling of services for media with different transmission speeds.

Meanwhile, as modulation schemes that can be switched in a communication system, there are QPSK (Quaternary Phase Shift Keying), 16QAM (16 Quadrature Amplitude Modulation) and 64QAM, etc. In these modulation schemes, frequency utilization efficiency increases from QPSK, 16QAM and 64QAM in that order, but with the increase of frequency utilization efficiency, an inter-signal distance also decreases in that order, which makes the system vulnerable to noise.

Therefore, an adaptive modulation scheme that adaptively switches between these modulation schemes, selects, for example, a modulation index (number of modulation multi-values) based on its average CNR, and can thereby select an optimum modulation scheme according to its propagation path environment (e.g., see the Unexamined Japanese Patent Publication No. HEI 11-275164, p 6, FIG. 2).

FIG. 1 is a block diagram showing a configuration of a conventional reception apparatus of a system that demodulates waveform distortion due to fading through adaptive equalization processing. Here, a TDMA (Time Division Multiple Access)-based communication system will be shown and suppose that known signal patterns (training signals) used for synchronization acquisition and transmission path estimation are inserted in processing units (burst, etc.) of a received signal. However, suppose information on a modulation index is not included in the received signal.

In FIG. 1, a reception apparatus 1 performs reception processing on the received signal at a wireless section 2 and then supplies this to an A/D (analog/digital) conversion section 3. The analog/digital conversion section 3 converts the received signal supplied from the wireless section 2 to a digital signal and then supplies it to a reception level measuring section 4, a transmission path estimation section 5, a synchronization section 6 and a demodulation scheme estimation decision section 10.

The reception level measuring section 4 measures intensity of the digital received signal (RSSI (Received Signal Strength Indicator) signal level) supplied from the A/D conversion section 3 and thereby performs gain control on the wireless section 2. The transmission path estimation section 5 performs transmission path estimation based on the digital received signal supplied from the A/D conversion section 3 and then supplies the result to a switching section 7. Furthermore, the synchronization section 6 performs coherent detection based on the digital received signal to acquire synchronization with the transmission path estimation section 5 and demodulation scheme estimation decision section 10.

The demodulation scheme estimation decision section 10 supplies the digital received signal supplied from the A/D conversion section 3 to demodulation estimation sections 11, 12 and 13. The demodulation estimation sections 11, 12 and 13 each demodulate a portion of the received signal (which is a training signal in a burst and portion modulated in the same way as for transmission data (data channel)) according to different demodulation schemes. For example, the demodulation estimation section 11 QPSK-demodulates the received signal, the demodulation estimation section 12 16QAM-demodulates the received signal and the demodulation estimation section 13 64QAM-demodulates the received signal.

Then, the demodulation estimation section 11 supplies the result of demodulation according to the assigned demodulation scheme to a likelihood calculation section 14, the demodulation estimation section 12 supplies the result of demodulation according to the assigned demodulation scheme to a likelihood calculation section 15 and the demodulation estimation section 13 supplies the result of demodulation according to the assigned demodulation scheme to a likelihood calculation section 16.

The likelihood calculation section 14 uses a training signal supplied from a training signal generation section 17 as an expected value and calculates a mean square error between the expected value and received signal as likelihood. On the other hand, the likelihood calculation section 15 uses a training signal supplied from a training signal generation section 18 as an expected value and calculates a mean square error between the expected value and received signal as likelihood. Furthermore, the likelihood calculation section 16 uses a training signal supplied from a training signal generation section 19 as an expected value and calculates a mean square error between the expected value and received signal as likelihood.

Training signals supplied from the training signal generation sections 17, 18 and 19 are the same training signals included in their respective received signals and the likelihood calculation sections 14, 15 and 16 calculate likelihood values using these training signals as expected values, and can thereby estimate which demodulation scheme is the most likely one, that is, estimate the demodulation schemes of the received signals according to which modulation was carried out on the transmitting side. This estimation processing is carried out by a demodulation scheme decision section 20 which has received the likelihood calculation results from the likelihood calculation sections 14, 15 and 16.

The result decided by the demodulation scheme decision section 20 is supplied to the switching sections 7 and 24 as a demodulation scheme selection signal. The switching section 7 selects any one of a plurality of equalization/demodulation sections 21, 22 and 23 provided beforehand according to expected demodulation schemes based on the demodulation scheme selection signal supplied from the demodulation scheme decision section 20.

That is, the equalization/demodulation section 21 is designed to demodulate the received signal using the same demodulation scheme as that used for demodulation at the demodulation estimation section 11, the equalization/demodulation section 22 is designed to demodulate the received signal using the same demodulation scheme as that used for demodulation at the demodulation estimation section 12 and the equalization/demodulation section 23 is designed to demodulate the received signal using the same demodulation scheme as that used for demodulation at the demodulation estimation section 13.

Therefore, the demodulation scheme decision section 20 selects the equalization/demodulation section capable of obtaining the most likely demodulation result based on the result of likelihood calculations from among the equalization/demodulation sections 21, 22 and 23 based on the demodulated signals supplied from the demodulation estimation sections 11, 12 and 13, and can thereby select the demodulation scheme corresponding to the demodulation scheme estimated to be the same as the modulation scheme on the transmitting apparatus side and demodulate the received signal.

The signals demodulated by the equalization/demodulation sections 21, 22 and 23 are supplied to an error correction section 25 through a switching section 24, subjected to forward error correction processing and then supplied to a reception quality measuring section 26. The reception quality measuring section 26 measures reception quality of decoded data supplied from the error correction section 25.

Thus, the reception apparatus 1 shown in FIG. 1 provides a demodulation section (demodulation estimation sections 11, 12 and 13) for each of a plurality of demodulation schemes corresponding to a plurality of demodulation schemes expected as the modulation scheme on the transmitting apparatus side, estimates the modulation scheme on the transmitting apparatus side based on the respective results of demodulation processing on the received signal through these demodulation sections, carries out demodulation processing according to this estimation result, and can thereby estimate the modulation scheme on the transmitting apparatus side through the reception apparatus 1 without sending any signal indicating the modulation scheme from the transmitting apparatus side.

However, the conventional reception apparatus 1 has a problem that as a method of estimating the demodulation scheme of a received signal, providing a plurality of demodulation sections (demodulation estimation sections 11, 12 and 13) corresponding to the estimated demodulation schemes for the demodulation scheme estimation decision section 10 and carrying out demodulation processing corresponding to the expected demodulation schemes at the demodulation estimation sections 11, 12 and 13 will increase the amount of processing and also increase power consumption.

SUMMARY OF THE INVENTION

It is an object of the present invention to provide a reception method, reception apparatus and wireless transmission system capable of easily estimating the demodulation scheme of a received signal with quite a simple configuration.

The present invention attains the above described object by assigning priority order to demodulation schemes to be candidates for estimation processing of the demodulation schemes and executing estimation processing on the demodulation schemes one by one in descending order of priority.

According to an aspect of the invention, a reception method for a wireless transmission system based on an adaptive modulation scheme which adaptively selects a plurality of modulation schemes according to variations in a propagation path characteristic, comprises a priority order adding step of adding priority order to-demodulation schemes to be candidates for estimation processing of the demodulation scheme, and an estimating step of executing estimation processing on demodulation schemes one by one in descending order of the priority and confirming a-demodulation scheme of the received signal when predetermined likelihood is obtained.

According to another aspect of the invention, a reception apparatus for a wireless transmission system based on an adaptive modulation scheme which adaptively selects a plurality of modulation schemes according to variations in a propagation path characteristic, comprises a demodulation scheme estimation section that demodulates a received signal according to a predetermined demodulation scheme, calculates likelihood of the demodulated received signal and estimates whether the demodulation scheme is a demodulation scheme corresponding to the modulation scheme of the received signal or not based on the calculated likelihood, and a demodulation scheme estimation control section that adds priority order to demodulation schemes to be candidates for the estimation, causes the demodulation scheme estimation section to execute estimation processing on demodulation schemes one by one in descending order of the priority and confirms a demodulation scheme of the received signal when predetermined likelihood is obtained.

According to still another aspect of the invention, a wireless transmission system comprises a transmission apparatus that adaptively selects a modulation scheme corresponding to a transmission signal from a plurality of modulation schemes according to variations in a propagation path characteristic, and a reception apparatus that comprises a demodulation scheme estimation section that demodulates a received signal according to a predetermined demodulation scheme, calculates likelihood of the demodulated received signal and estimates whether the demodulation scheme is a demodulation scheme corresponding to the modulation scheme of the received signal or not based on the calculated likelihood, and a demodulation scheme estimation control section that adds priority order to-demodulation schemes to be candidates for the estimation, causes the demodulation scheme estimation section to execute estimation processing on demodulation schemes one by one in descending order of the priority order and confirms a demodulation scheme of the received signal when predetermined likelihood is obtained.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 4 is a schematic view of a modulation scheme of each logical channel in the wireless transmission system;

FIG. 7 is a schematic view for illustrating the method of deciding priority processing according to the embodiment of the present invention;

FIG. 8 is another schematic view for illustrating the method of deciding priority processing according to the embodiment of the present invention;

DESCRIPTION OF THE PREFERRED EMBODIMENT

With reference now to the attached drawings, an embodiment of the present invention will be explained in detail below.

Figure 1:
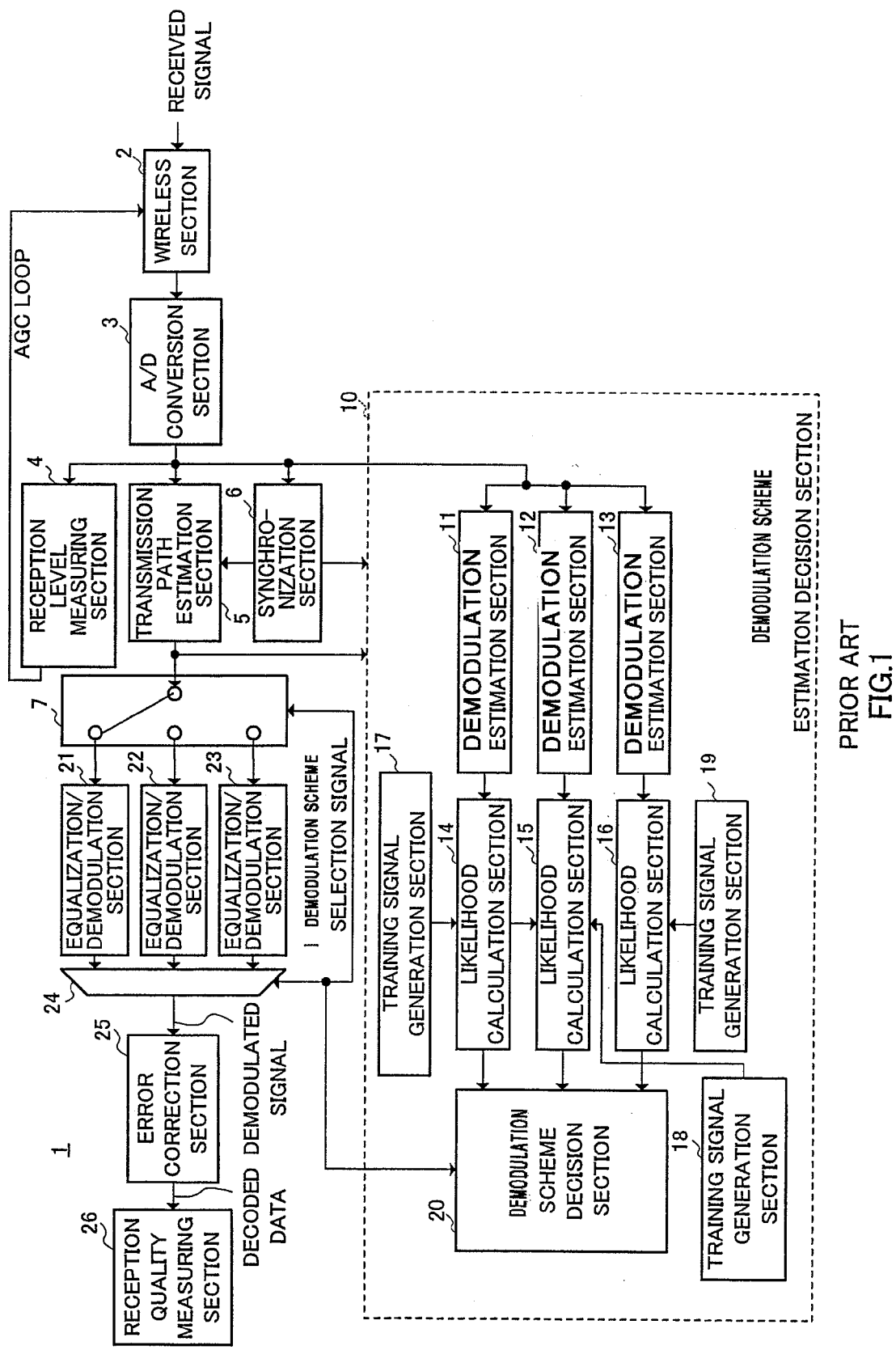
FIG. 1 is a block diagram showing a configuration of a conventional reception apparatus.
Figure 2:
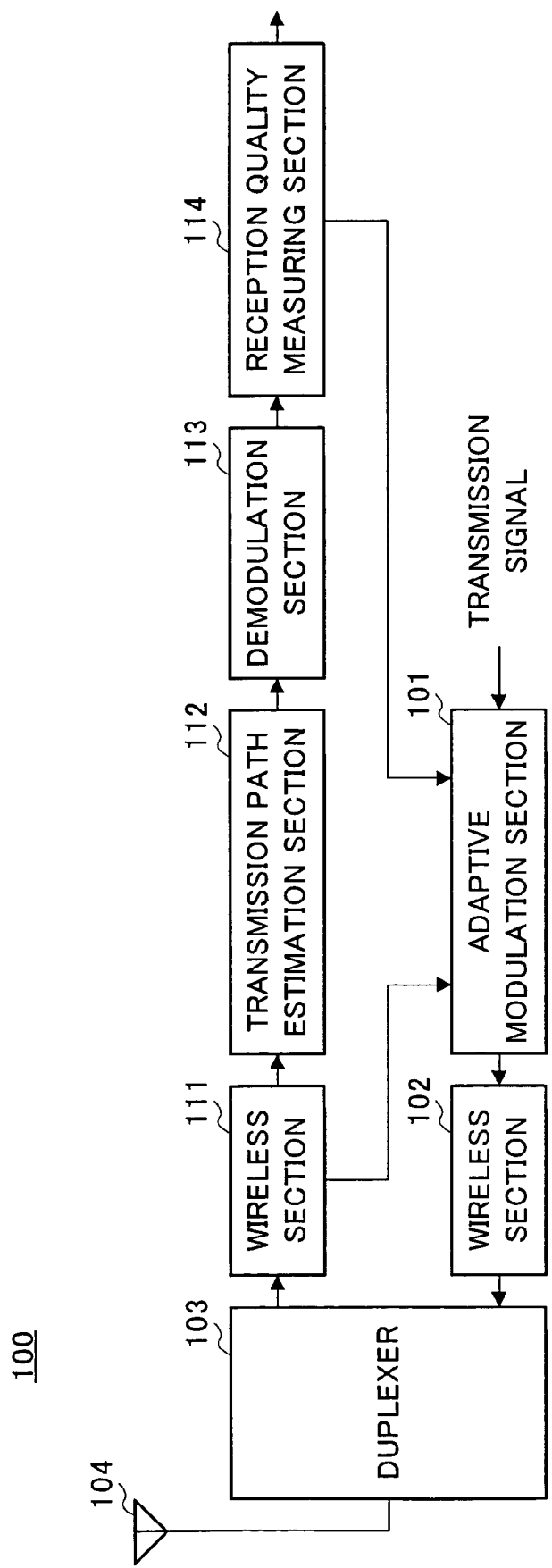
FIG. 2 is a block diagram showing a configuration of a base station apparatus in a wireless transmission system according to an embodiment of the present invention.

FIG. 2 is a block diagram showing a configuration of a base station apparatus 100 including a transmission apparatus in a wireless transmission system according to an embodiment of the present invention. This base station apparatus 100 has a configuration of a receiver in a system of demodulating waveform distortion due to fading through adaptive equalization processing. Here, a TDMA (Time Division Multiple Access) communication system will be shown and suppose known signal patterns (training signals) used for acquisition of synchronization and estimation of a transmission path are inserted in processing units (burst, etc.) of a received signal. However, suppose information on a modulation index is not included in the received signal.

This base station apparatus 100 receives a signal through an antenna 104 and receives this signal at a wireless section 111 through a duplexer 103.

The wireless section 111 converts the received signal of a wireless frequency band to a low frequency, supplies it to a transmission path estimation section 112 and estimates a transmission path here. The output signal of the transmission path estimation section 112 is supplied to a demodulation section 113 and subjected to demodulation processing. The result of the demodulation processing is supplied to a reception quality measuring section 114 where reception quality such as BER (Bit Error Rate) is measured.

Furthermore, the base station apparatus 100 receives a transmission signal at an adaptive modulation section 101 where a modulation scheme is adaptively determined according to channel quality. In this case, the adaptive modulation section 101 receives a reception level of the received signal from the wireless section 111 and at the same time receives measurement results of BER, etc., from a reception quality measuring section 114, estimates channel quality from at least one of them and selects a modulation scheme based on the estimation result.

For example, there are modulation schemes such as QPSK (Quaternary Phase Shift Keying) modulation, 16QAM (Quadrature Amplitude Modulation) modulation or 64QAM modulation and one of them is selected according to channel quality. The adaptive modulation section 101 modulates the transmission signal according to the selected modulation scheme and supplies this to the wireless section 102. The wireless section 102 converts the modulated transmission signal to a wireless frequency band and transmits this through the duplexer 103 and antenna 104.

Figure 3:
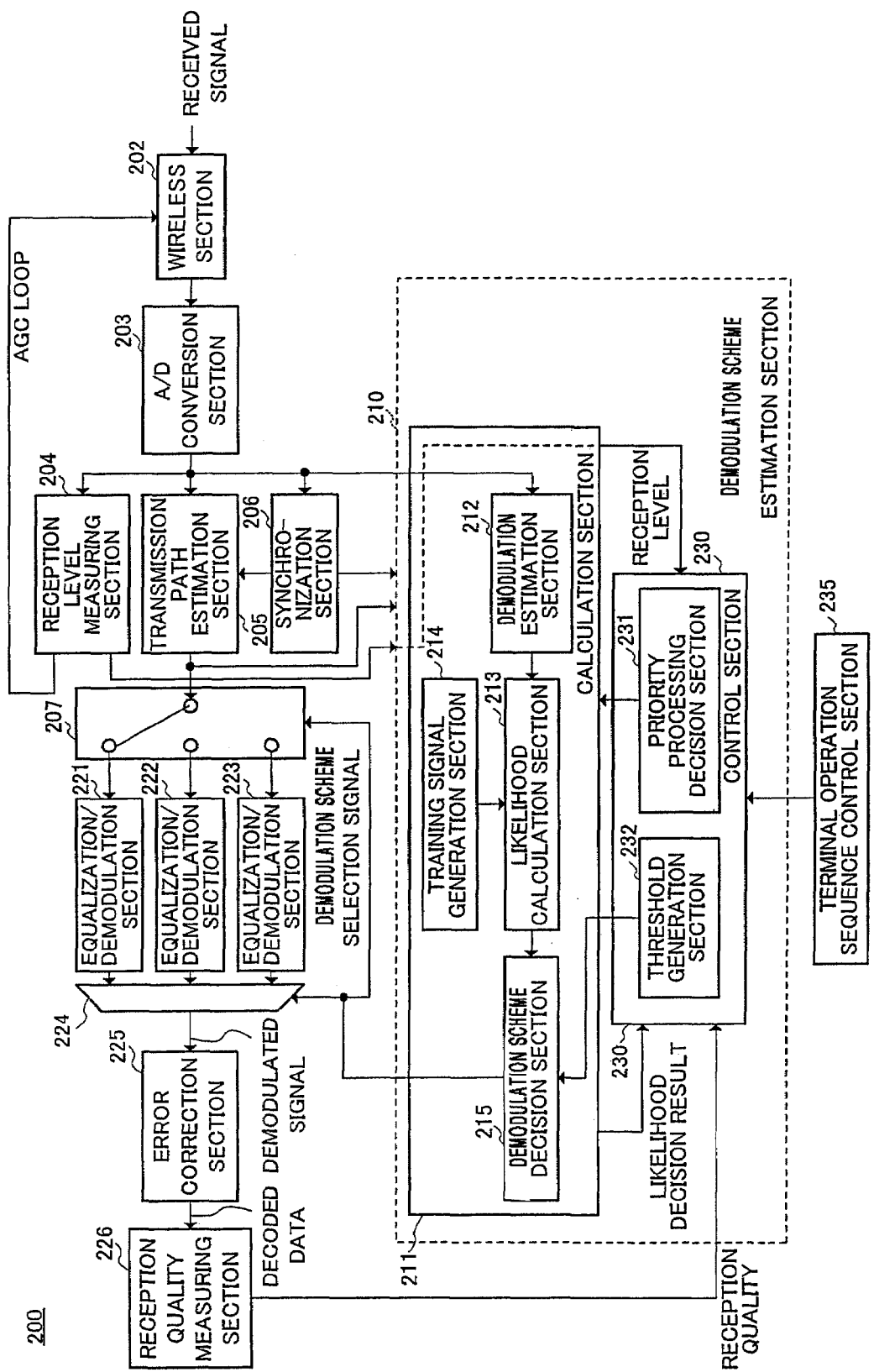
FIG. 3 is a block diagram showing a configuration of a reception apparatus according to the embodiment of the present invention.

FIG. 3 is a block diagram showing a configuration of a reception apparatus (wireless terminal apparatus) 200 according to an embodiment of the present invention. Here, a TDMA (Time Division Multiple Access) communication system will be shown and suppose that known signal patterns (training signals) used for synchronization acquisition and transmission path estimation are inserted in processing units (burst, etc.) of a received signal. However, suppose information on a modulation index is not included in the received signal.

In FIG. 3, a reception apparatus 200 carries out reception processing on a received signal at a wireless section 202 and then supplies it to an A/D (analog/digital) conversion section 203. After converting the received signal supplied from the wireless section 202 to a digital signal, the A/D conversion section 203 supplies it to a reception level measuring section 204, a transmission path estimation section 205, a synchronization section 206 and a demodulation scheme estimation decision section 210.

The reception level measuring section 204 measures intensity of the digital received signal (RSSI (Received Signal Strength Indicator) signal level) supplied from the A/D conversion section 203 and thereby performs gain control on the wireless section 202. The transmission path estimation section 205 performs transmission path estimation based on the digital received signal supplied from the A/D conversion section 203 and then supplies the result to a switching section 207. Furthermore, the synchronization section 206 performs coherent detection based on the digital received signal to acquire synchronization with the transmission path estimation section 205 and demodulation scheme estimation decision section 210.

The demodulation scheme estimation decision section 210 supplies the digital received signal supplied from the A/D conversion section 203 to a demodulation estimation section 212. The demodulation estimation section 212 selects a demodulation scheme based on a control signal that specifies the current processing scheme which is supplied from a priority processing decision section 231 of the control section 230 and demodulates a portion of the received signal (which is a training signal in a burst and portion modulated in the same way as for transmission data (data channel)). For example, the demodulation estimation section 212 demodulates the received signal according to the demodulation scheme specified by a control signal supplied from the priority processing decision section 231 out of QPSK demodulation, 16QAM demodulation and 64QAM demodulation.

Then, the demodulation estimation section 212 supplies the result of demodulation according to the assigned modulation scheme to a likelihood calculation section 213. The likelihood calculation section 213 uses a training signal supplied from a training signal generation section 214 as an expected value and calculates a mean square error between the expected value and received signal as likelihood.

The training signal supplied from the training signal generation section 214 is the same training signal included in the received signal and the likelihood calculation section 213 calculates likelihood using this training signal as an expected value and thereby determines likelihood of the demodulated signal demodulated at the demodulation estimation section 212.

The likelihood calculated at the likelihood calculation section 213 is supplied to the demodulation scheme decision section 215 and compared with a threshold supplied from a threshold generation section 232 of the control section 230. Based on this comparison result, if the likelihood supplied from the likelihood calculation section 213 is equal to or greater than the threshold supplied from the threshold generation section 232, the modulation demodulation scheme decision section 215 decides that the demodulation scheme (modulation index) at the modulation demodulation estimation section 212 at this time corresponds to the modulation scheme on the transmitting apparatus side and supplies a modulation demodulation scheme selection signal for selecting the demodulation scheme corresponding to the modulation scheme to the switching sections 207 and 224. In this way, the switching sections 207 and 224 select the equalization/demodulation section 221, 222 or 223 corresponding to the modulation demodulation scheme specified by the modulation demodulation scheme selection signal.

In contrast, when the likelihood calculated at the likelihood calculation section 213 as the decision result at the demodulation scheme decision section 215 falls below the threshold supplied from the threshold generation section 232, this result is supplied to the control section 230. Upon receipt of the result showing that the value falls below this threshold, the control section 230 selects another demodulation scheme preset at the priority processing decision section 231 instead of the demodulation scheme selected at the demodulation estimation section 212 at this time and the-demodulation estimation section 212 controls so that the received signal is subjected to demodulation processing according to the demodulation scheme.

The control section 230 predetermines priority when selecting other demodulation schemes (modulation indices) at the priority processing decision section 231. In this embodiment, three demodulation schemes provided as equalization/demodulation sections 221, 222 and 223, are set as the demodulation schemes to be selected and these demodulation schemes are provided with priority beforehand and the demodulation scheme of the demodulation estimation section 212 to be determined next is selected according to the priority.

The communication system including this reception apparatus 200 has logical channels of received signals such as synchronization channel, control channel, speech channel and data channel as shown in FIG. 4, the channels except the data channel are assigned predetermined modulation schemes.

For example, according to the example of the embodiment shown in FIG. 4, modulation scheme A is assigned to the synchronization channel, modulation scheme A is assigned to the control channel and modulation scheme B is assigned to the speech channel. Therefore, the transmitting apparatus side of this communication system is designed to carry out modulation according to a modulation scheme assigned beforehand for these channels and the reception apparatus 200 which receives this transmission signal demodulates the respective channels (synchronization channel, control channel and speech channel) corresponding to these predetermined modulation schemes (modulation indices).

Therefore, the reception apparatus 200 can predict the modulation scheme of the burst (slot, frame, etc.) to be received next based on a predetermined operation sequence (in the receiving order of synchronization channel, control channel and speech channel) for the synchronization channel, control channel and speech channel.

On the other hand, for the data channel, the transmitting apparatus side is designed to select an optimal modulation scheme from a plurality of modulation schemes provided beforehand according to the channel condition (reception power, error rate, S/N ratio, etc.).

Figure 5:
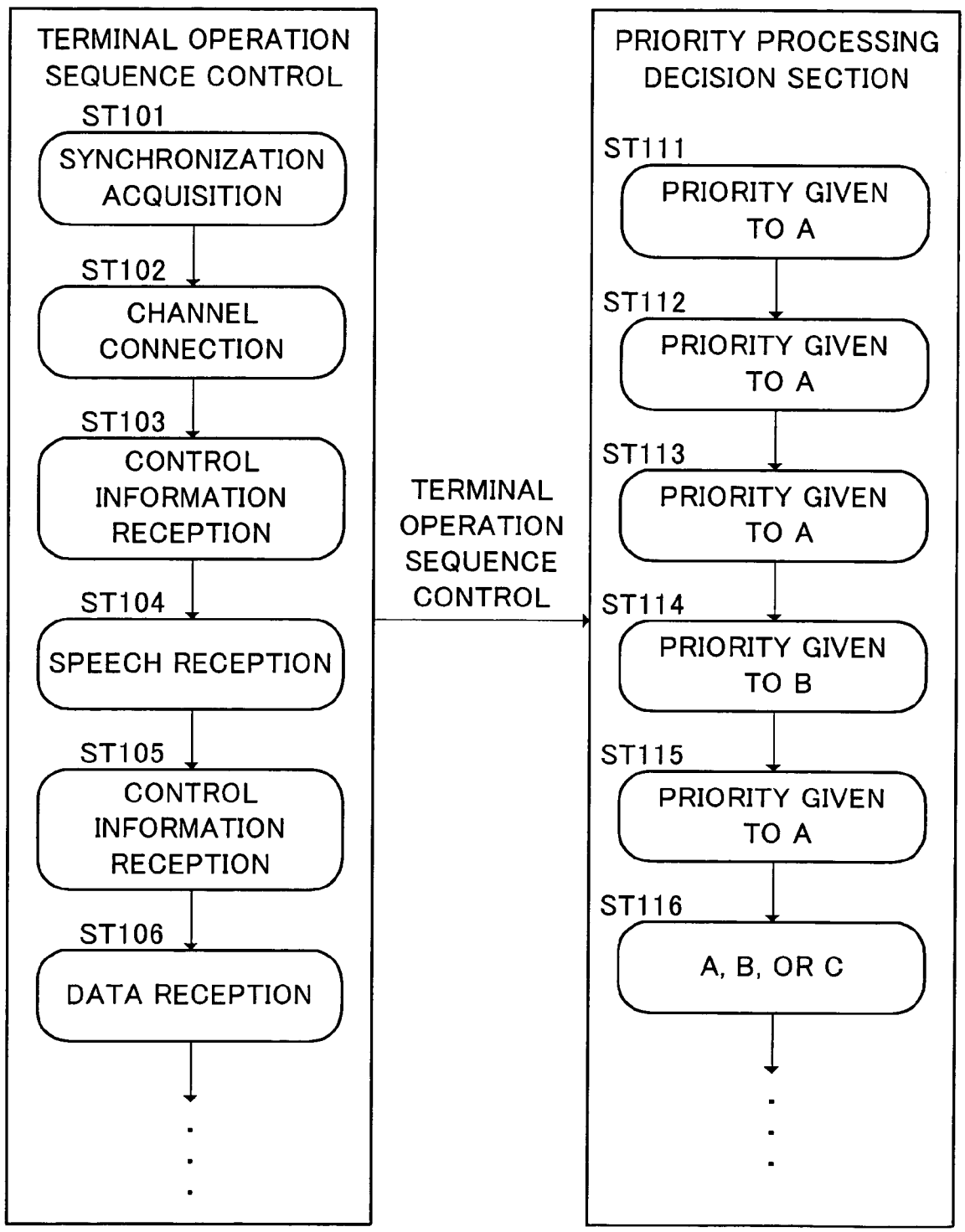
FIG. 5 is a flow chart illustrating a method of deciding priority processing according to the embodiment of the present invention.

FIG. 5 is a flow chart showing a decision processing procedure for deciding priority of the priority processing decision section 231 for the synchronization channel, control channel and speech channel to which the modulation schemes described above in FIG. 4 are assigned based on the sequence control by the reception apparatus 200.

As shown in this FIG. 5, the sequence control by the reception apparatus 200 consists of synchronization acquisition (step ST101) by the synchronization section 206, channel connection (step ST102), control information reception (step ST103), speech reception (step ST104), control information reception (step ST105) and data reception (step ST106).

The terminal operation sequence control section 235 of the reception apparatus 200 decides priority demodulation processing at the priority processing decision section 231 based on the information on this sequence control. That is, when synchronization acquisition in step ST101 is carried out as the terminal operation sequence control in FIG. 5, the priority processing decision section 231 decides the demodulation scheme (modulation index) at the demodulation estimation section 212 in response to this synchronization acquisition processing. As this demodulation scheme, the demodulation scheme corresponding to the modulation scheme A of the synchronization channel is selected as described above in FIG. 4 (step ST111).

Then, when the terminal operation sequence control is shifted to the channel connection processing in step ST102, the priority processing decision section 231 selects the demodulation scheme corresponding to the modulation scheme A of the synchronization channel according to the channel connection processing (step ST112).

When the terminal operation sequence control is shifted to the control information reception processing in step ST103, the priority processing decision section 231 selects the demodulation scheme corresponding to the modulation scheme A of the control channel (step ST113).

Since the modulation scheme A is predetermined as the modulation scheme of the synchronization channel and control channel up to this point, the priority processing decision section 231 sets the demodulation scheme corresponding to the modulation scheme A as the demodulation scheme at the demodulation estimation section 212. Then, when the terminal operation sequence control is shifted to step ST104, the priority processing decision section 231 selects the demodulation scheme corresponding to the modulation scheme B of the speech channel (step ST114). This causes the demodulation scheme at the modulation estimation section 212 to be set to the demodulation scheme corresponding to the modulation scheme B of the speech channel.

When the terminal operation sequence control is shifted to control information reception processing in step ST105, the priority processing decision section 231 selects a modulation index (demodulation scheme) corresponding to the modulation scheme A of the control channel (step ST115).

Thus, in steps ST101 to ST105 and steps ST111 to ST115 shown in the example of the terminal operation sequence control, a demodulation scheme at the priority processing decision section 231 is selected based on the predetermined modulation scheme in the communication system. In contrast, when the terminal operation sequence control is shifted to step ST106, data reception processing for which no unique modulation scheme is predetermined is started.

In this data reception processing, the transmitting apparatus side selects and sends a modulation scheme which is most suitable for the channel condition at that time from a plurality of modulation schemes provided beforehand according to the channel condition as described above. When the data sent from the transmission apparatus is received in this way, the demodulation scheme estimation decision section 210 of the reception apparatus 200 estimates and decides the modulation scheme according to which the data has been modulated from the plurality of demodulation schemes provided beforehand and selects the demodulation scheme (modulation index) corresponding to the most likely modulation scheme. In this case, the priority processing decision section 231 sets demodulation schemes for the plurality of provided demodulation schemes in a predetermined order in the demodulation estimation section 212 and carries out demodulation, calculation of likelihood and decision on the demodulation scheme according to the respective demodulation schemes (step ST116).

This allows the demodulation scheme estimation decision section 210 to estimate the modulation scheme of the data channel of the received signal only using one set of the demodulation estimation section 212, likelihood calculation section 213 and demodulation scheme decision section 215.

Figure 6:
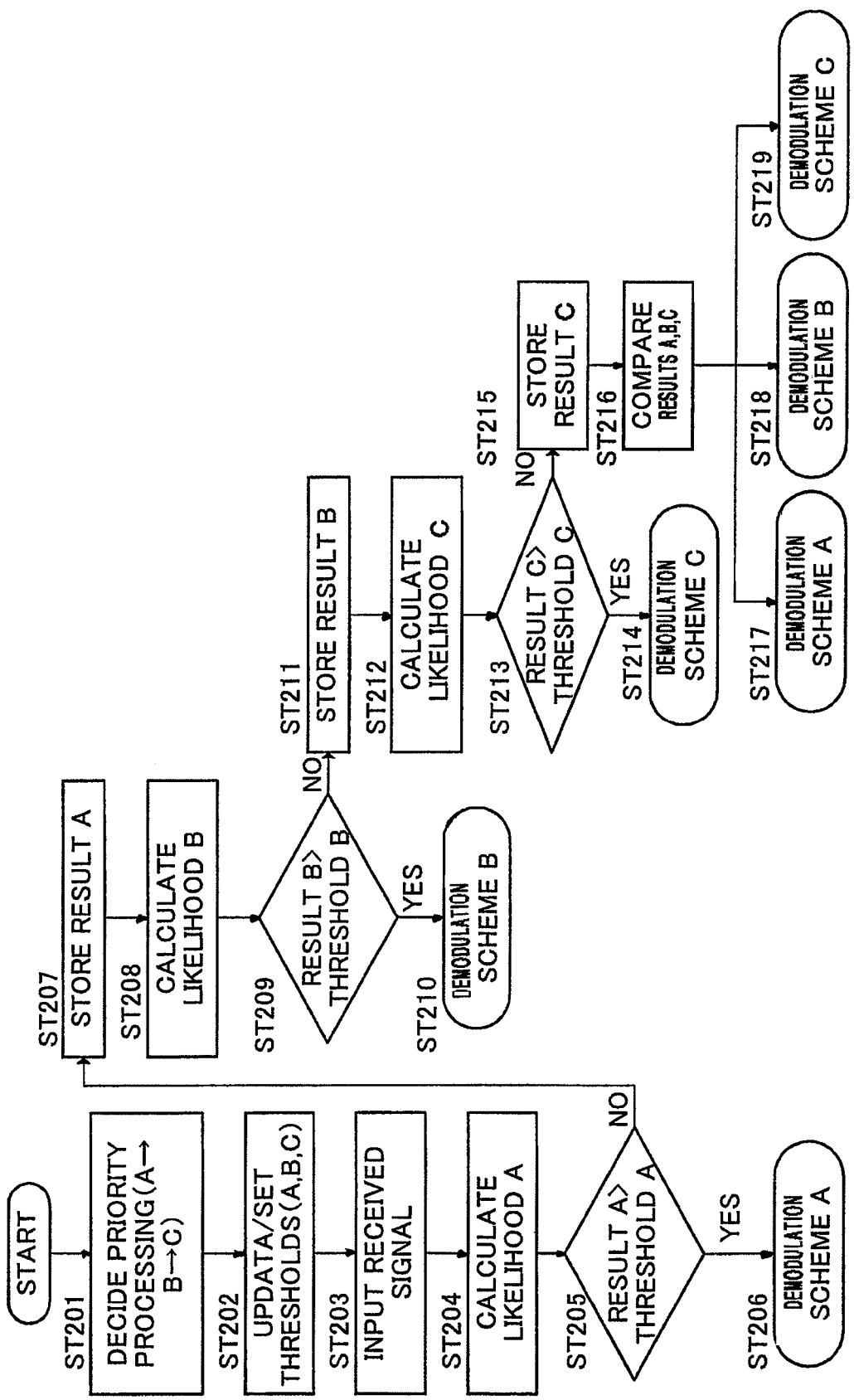
FIG. 6 is a flow chart illustrating a demodulation scheme estimation processing procedure of the reception apparatus according to the embodiment of the present invention.

By the way, FIG. 6 is a flow chart showing the estimation processing procedure of the demodulation scheme which is the processing in step ST116 shown in FIG. 5. As shown in this FIG. 6, the control section 230 of the reception apparatus 200 decides priority order of demodulation schemes at the demodulation estimation section 212 in step ST201 first, that is, decides which demodulation scheme should be set as the processing of high priority. In the case of this embodiment, suppose priority of each demodulation scheme is predetermined as described above.

The control section 230 moves on to step ST202 and sets a threshold A corresponding to the demodulation scheme A determined in above described step ST201. Therefore, the demodulation scheme decision section 215 decides likelihood supplied from the likelihood calculation section 213 based on the threshold A set in this step ST202.

When the setting of priority order, that is, the setting of the demodulation scheme A and the setting of the threshold A according to the demodulation scheme A are completed in this way, the demodulation scheme estimation decision section 210 moves on to the next step ST203, inputs the received signal to the demodulation estimation section 212, and further calculates likelihood in step ST204 based on the demodulation result at the demodulation estimation section 212.

Then, the likelihood calculated in step ST204 is compared with the threshold A by the demodulation scheme decision section 215 in step ST205. When an affirmative result is obtained in this step ST205, this means that the likelihood A calculated here is greater than the threshold A, that is, the demodulation scheme A set at the demodulation estimation section 212 at this time is estimated to correspond to the modulation scheme A on the transmitting apparatus side and the demodulation scheme decision section 215 moves on to step ST206, decides that the modulation scheme A corresponding to the demodulation scheme A set at the demodulation estimation section 212 is the modulation scheme on the transmitting apparatus side and sets the demodulation scheme A as the demodulation scheme in the actual reception processing. In this way, a selection signal for selecting the set demodulation scheme A is supplied from the demodulation scheme decision section 215 to the switching sections 207 and 224 and the equalization/demodulation section (any one of equalization/demodulation section 221, 222 or 223) to execute this selected demodulation scheme A is selected.

In contrast to this, if a negative result is obtained in step ST205, this means that the likelihood A calculated in step ST204 is smaller than the threshold A, that is, the demodulation scheme A set at the demodulation estimation section 212 at this time is estimated not to correspond to the modulation scheme on the transmitting apparatus side and the control section 230 moves on to step ST207 and stores the likelihood A calculated in step ST204 above in a predetermined storage section (not shown).

Then, the control section 230 moves on to step ST208, changes the demodulation scheme set at the modulation estimation section 212 from the demodulation scheme A which has been set so far to the demodulation scheme B which has the next highest priority according to the priority order decided by the priority processing decision section 231. Then, the demodulation estimation section 212 applies demodulation processing according to the newly set demodulation scheme B to the received signal and supplies the result to the likelihood calculation section 213. In this way, the likelihood calculation section 213 obtains likelihood B which is the demodulation result according to the new demodulation scheme B.

The demodulation scheme decision section 215 moves on to step ST209, compares the likelihood B calculated in step ST208 with the threshold B generated at the threshold generation section 232 according to the demodulation scheme B at this time and decides whether the likelihood B is equal to or greater than the threshold B or not.

When an affirmative result is obtained in this step ST209, this means that the likelihood obtained at this time is greater than the threshold B, that is, the demodulation scheme B demodulated at the demodulation estimation section 212 at this time is estimated to correspond to the modulation scheme on the transmitting apparatus side. At this time, the demodulation scheme decision section 215 moves on to step ST210, decides that the modulation scheme B corresponding to the demodulation scheme B set at the demodulation estimation section 212 at this time is the modulation scheme on the transmitting apparatus side and sets the demodulation scheme B as the demodulation scheme in the actual reception processing. In this way, the selection signal for selecting the demodulation scheme B set is supplied from the demodulation scheme decision section 215 to the switching sections 207 and 224 and the equalization/demodulation section (any one of the equalization/demodulation section 221, 222 or 223) to execute this selected demodulation scheme is selected.

In contrast to this, if a negative result is obtained in step ST209, this means that the likelihood B calculated at this time is smaller than the threshold B, that is, the demodulation scheme B demodulated at the demodulation estimation section 212 at this time is estimated not to correspond to the modulation scheme (modulation index) on the transmitting apparatus side. At this time, the control section 230 moves on to step ST211 and stores the likelihood B calculated in step ST208 above in a predetermined storage section (not shown).

Then, the control section 230 moves on to step ST212, changes the demodulation scheme set at the modulation estimation section 212 from the demodulation scheme B set so far to the demodulation scheme C with the next highest priority according to the priority order decided at the priority processing decision section 231. Then, the demodulation estimation section 212 applies demodulation processing to the received signal according to the newly set demodulation scheme C and supplies the result to the likelihood calculation section 213. In this way, the likelihood calculation section 213 obtains likelihood C which is the result of demodulation according to the new demodulation scheme C.

The demodulation scheme decision section 215 moves on to step ST213, compares the likelihood C calculated in step ST212 with the threshold C generated at the threshold generation section 232 in response to the demodulation scheme C at this time and decides whether the likelihood C is equal to or greater than the threshold C or not.

When an affirmative result is obtained in this step ST213, this means that the likelihood C obtained at this time is greater than the threshold C, that is, the demodulation scheme C set at the demodulation estimation section 212 at this time is estimated to correspond to the modulation scheme C (modulation index) on the transmitting apparatus side. At this time, the demodulation scheme decision section 215 moves on to step ST214, decides that the modulation scheme C corresponding to the demodulation scheme C set at the demodulation estimation section 212 is the modulation scheme on the transmitting apparatus side and sets the demodulation scheme C as the demodulation scheme in the actual reception processing. In this way, the selection signal for selecting the demodulation scheme C set is supplied from the demodulation scheme decision section 215 to the switching sections 207 and 224 and the equalization/demodulation section (any one of the equalization/demodulation section 221, 222 or 223) to execute this selected demodulation scheme C is selected.

In contrast to this, if a negative result is obtained in step ST213, this means that the likelihood C calculated at this time is smaller than the threshold C, that is, the demodulation scheme C set at the demodulation estimation section 212 at this time is estimated not to correspond to the modulation scheme on the transmitting apparatus side and the control section 230 moves on to step ST215 and stores the likelihood C calculated in step ST212 above in a predetermined storage section (not shown).

In this way, when a negative result is obtained in step ST213, this means that all the preset demodulation schemes (modulation coefficients) do not have the likelihood enough to obtain predetermined likelihood (likelihood equal to or greater than a threshold). Therefore, in this case, the control section 230 moves on to step ST216 and compares the levels of likelihood (likelihood A, likelihood B, likelihood C) of the respective demodulation schemes stored in step ST207, step ST211 and step ST215 above.

Then, when a comparison result that likelihood A is largest is obtained, the demodulation scheme A with which this likelihood A is obtained is estimated to be the most likely one among the three demodulation schemes, and the control section 230 moves on to step ST217, decides that the modulation scheme A corresponding to the demodulation scheme A with which this likelihood A is obtained is the modulation scheme on the transmitting apparatus side and sets the demodulation scheme A as the demodulation scheme in the actual reception processing. In this way, the selection signal for selecting the demodulation scheme set is supplied from the demodulation scheme decision section 215 to the switching sections 207 and 224 and the equalization/demodulation section (any one of the equalization/demodulation section 221, 222 or 223) to execute this selected demodulation scheme is selected.

In contrast to this, if a result that the likelihood B is largest is obtained in step ST216, this likelihood B is estimated to be the most likely one among the three demodulation schemes, and the control section 230 moves on to step ST218, decides that this likelihood B is the modulation scheme corresponding to the demodulation scheme B and sets the demodulation scheme B as the demodulation scheme in the actual reception processing. In this way, the selection signal for selecting the demodulation scheme set is supplied from the demodulation scheme decision section 215 to the switching sections 207 and 224 and the equalization/demodulation section (any one of the equalization/demodulation section 221, 222 or 223) to execute this selected demodulation scheme is selected.

In contrast to this, if a comparison result that the likelihood C is largest is obtained in step ST216, the demodulation scheme C with which this likelihood C is obtained is estimated to be the most likely one among the three demodulation schemes, and the control section 230 moves on to step ST219, decides that this likelihood C is the modulation scheme corresponding to the demodulation scheme C with which this likelihood C is obtained and sets the demodulation scheme C as the demodulation scheme in the actual reception processing. In this way, the selection signal for selecting the demodulation scheme set is supplied from the demodulation scheme decision section 215 to the switching sections 207 and 224 and the equalization/demodulation section (any one of the equalization/demodulation section 221, 222 or 223) to execute this selected demodulation scheme is selected.

In this way, by estimating the modulation schemes on the transmitting apparatus side one by one according to the procedure shown in FIG. 6 and by only providing one set of the demodulation estimation section 212, likelihood calculation section 213 and demodulation scheme decision section 215, it is possible to estimate the modulation scheme on the transmitting apparatus side and decide the demodulation scheme (modulation index) corresponding thereto.

Because the transmitting apparatus side decides a modulation scheme (modulation index) according to the channel condition, when the reception apparatus 200 estimates the data channel demodulation scheme according to the procedure shown in FIG. 6, the reception apparatus 200 decides the priority order of demodulation schemes (demodulation schemes A, B and C) to be set in the demodulation estimation section based on reception quality such as BER (Bit Error Rate) at the reception apparatus 200.

That is, this embodiment provides modulation schemes (demodulation schemes) provided beforehand for setting in descending order of modulation indices, that is, modulation scheme A, modulation scheme B and modulation scheme C (demodulation scheme A, demodulation scheme B and demodulation scheme C) in that order. Since higher channel quality (reception quality) is required as the modulation index increases, the reception apparatus 200 estimates the priority order of modulation schemes on the transmitting apparatus side (that is, demodulation schemes at the reception apparatus 200) based on the previous reception quality, and can thereby increase the probability that the estimation result will match the actual modulation scheme.

In order to decide the priority order of demodulation schemes using such a method, this embodiment is designed to store the table shown in FIG. 7 in a predetermined storage section (not shown) and decide the priority order of demodulation schemes to be set in the demodulation estimation section 212 this time based on the previous demodulation scheme decision result and the previous reception quality.

That is, the reception apparatus 200 measures BER (Bit Error Rate) from decoded data at the reception quality measuring section 226 and supplies this measurement result to the control section 230. The priority processing decision section 231 of the control section 230 decides the priority order of demodulation schemes to be set in the demodulation estimation section 212 this time based on the reception quality supplied from the reception quality measuring section 226.

This decision method will be explained with reference to FIG. 7. The priority processing decision section 231 stores the demodulation scheme (that is, the estimation result of modulation schemes on the transmitting apparatus side) previously set in the demodulation estimation section 212 and decides the priority order of the demodulation scheme (that is, the modulation scheme to be estimated on the transmitting apparatus side of the received signal this time) to be set in the demodulation estimation section 212 this time based on this previously stored demodulation scheme and the previous reception quality supplied from the reception quality measuring section 226.

For example, when the previously estimated modulation scheme (demodulation scheme set in the demodulation estimation section 212) is the modulation scheme B (demodulation scheme B) and the previous reception quality is "good", the priority processing decision section 231 decides that the modulation index in the burst this time is the demodulation scheme C which is a modulation index one stage higher than the previously estimated modulation index and sets the priority order of demodulation schemes to be set in the demodulation estimation section 212 this time as demodulation scheme C, demodulation scheme B and demodulation scheme A in that order. Thus, when the previous reception quality is good, since the modulation scheme decided on the transmitting apparatus side based on the channel quality this time can be decided with the highest probability to be the modulation scheme C requiring higher channel quality than the previous modulation scheme B, the priority processing decision section 231 decides the demodulation scheme C corresponding to this modulation scheme C as the demodulation scheme with the highest priority and decides the remaining demodulation schemes in descending order of modulation indices as the priority order. When the previous reception quality is good, this causes demodulation schemes to be decided as the priority order from the one whose modulation index is one stage lower than the previous modulation index in descending order, which makes it possible to find the demodulation scheme that matches the actual modulation scheme according to the channel condition more quickly.

On the contrary, the previously estimated modulation scheme (demodulation scheme set in the demodulation estimation section 212) is the modulation scheme B (demodulation scheme B) and its previous reception quality is "bad", the priority processing decision section 231 decides that the modulation index in the burst this time is the demodulation scheme A whose modulation index is one stage lower than the previously estimated modulation index and sets the priority order of demodulation schemes to be set in the demodulation estimation section 212 this time as demodulation scheme A, demodulation scheme B and demodulation scheme C in that order. In this way, when the previous reception quality is bad, since the modulation scheme determined based on the channel quality on the transmitting apparatus side this time can be decided with the highest probability to be the modulation scheme A requiring channel quality lower than the previous modulation scheme B, the priority processing decision section 231 decides that the demodulation scheme A corresponding to this modulation scheme A to be the demodulation scheme with the highest priority and decides the remaining demodulation schemes in descending order of modulation indices as the priority order. In this way, when the previous reception quality is bad, the demodulation schemes from the one whose modulation index is one stage lower than the previous modulation index in ascending order of modulation indices are decided as the priority order and it is thereby possible to find the demodulation scheme that matches the actual modulation scheme according to the channel condition more quickly.

The method of deciding the priority order of demodulation schemes set in the demodulation estimation section 212 is not limited to the method of deciding the priority order based on the previously estimated demodulation scheme and previous BER, but it is also possible to decide the priority order based on the received signal level this time as the reception quality.

In this case, the reception apparatus 200 supplies the reception level (RSSI: Received Signal Strength Indicator) this time measured at the reception level measuring section 204 to the control section 230 and the priority processing decision section 231 of the control section 230 can decide the priority order of the demodulation scheme to be set in the demodulation estimation section 212 based on this supplied reception level and the previously estimated demodulation scheme.

This decision method will be explained with reference to FIG. 8. The priority processing decision section 231 stores the demodulation scheme previously set in the demodulation estimation section 212 (that is, estimation result according to the modulation scheme on the transmitting apparatus side) and decides the priority order of demodulation schemes to be set in the demodulation estimation section 212 this time (that is, the modulation scheme estimated on the transmitting apparatus side of the received signal this time) based on this stored previous demodulation scheme and the reception level this time supplied from the reception level measuring section 204.

For example, when the previously estimated modulation scheme (demodulation scheme set in the demodulation estimation section 212) is the modulation scheme B (demodulation scheme B) and the reception level this time is higher, the priority processing decision section 231 decides that the modulation index in the burst this time is the demodulation scheme C whose modulation index is one stage higher than the previously estimated modulation index and sets the priority order of the demodulation scheme to be set in the demodulation estimation section 212 this time as demodulation scheme C, demodulation scheme B and demodulation scheme A in that order. In this way, when the reception level this time is higher, since the modulation scheme decided on the transmitting apparatus side based on the channel quality can be decided with the highest probability to be the modulation scheme C for which higher channel quality than that of the previous modulation scheme B is required, the priority processing decision section 231 determines the demodulation scheme C corresponding to this modulation scheme C as the demodulation scheme with the highest priority and then decides the remaining demodulation schemes in descending order of modulation indices as the priority order. This makes it possible to decide the demodulation scheme this time based on the reception level this time and thereby find the demodulation scheme that matches the actual modulation scheme according to the channel condition more quickly and more easily.

On the contrary, when the previously estimated modulation scheme (demodulation scheme set in the demodulation estimation section 212) is the modulation scheme B (demodulation scheme B) and the reception quality this time is lower, the priority processing decision section 231 decides that the modulation index in the burst this time is the demodulation scheme A whose modulation index is one stage lower than the previously estimated modulation index and sets the priority of the demodulation scheme to be set in the demodulation estimation section 212 this time as demodulation scheme A, demodulation scheme B and demodulation scheme C in that order. In this way, when the reception level this time is lower, since the modulation scheme decided on the transmitting apparatus side based on the channel quality can be decided with the highest probability to be the modulation scheme A for which lower channel quality than that of the previous modulation scheme B is required, the priority processing decision section 231 determines the demodulation scheme A corresponding to this modulation scheme A as the demodulation scheme with the highest priority and then decides the remaining demodulation schemes in ascending order of modulation indices as the priority order. This makes it possible to decide the demodulation scheme this time based on the reception level this time and thereby find the demodulation scheme that matches the actual modulation scheme according to the channel condition more quickly and more easily.

The above described embodiment has described the case where the previous BER or reception level this time is used, but the present invention is not limited to this and can also be adapted so as to use BER this time or previous reception level. Furthermore, it is possible to use not only BER but also an SN ratio, etc.

Then, the method of updating threshold A, B or C in the procedure for the estimation processing of the demodulation scheme described above in FIG. 6 will be explained. The threshold to be compared with likelihood at the threshold demodulation scheme control section 215 is updated at the threshold generation section 232 for each modulation index.

The threshold generation section 232 decides a threshold based on the reception quality (BER, etc.) supplied from the reception quality measuring section 226 or the reception level supplied from the reception level measuring section 204.

Figure 9:
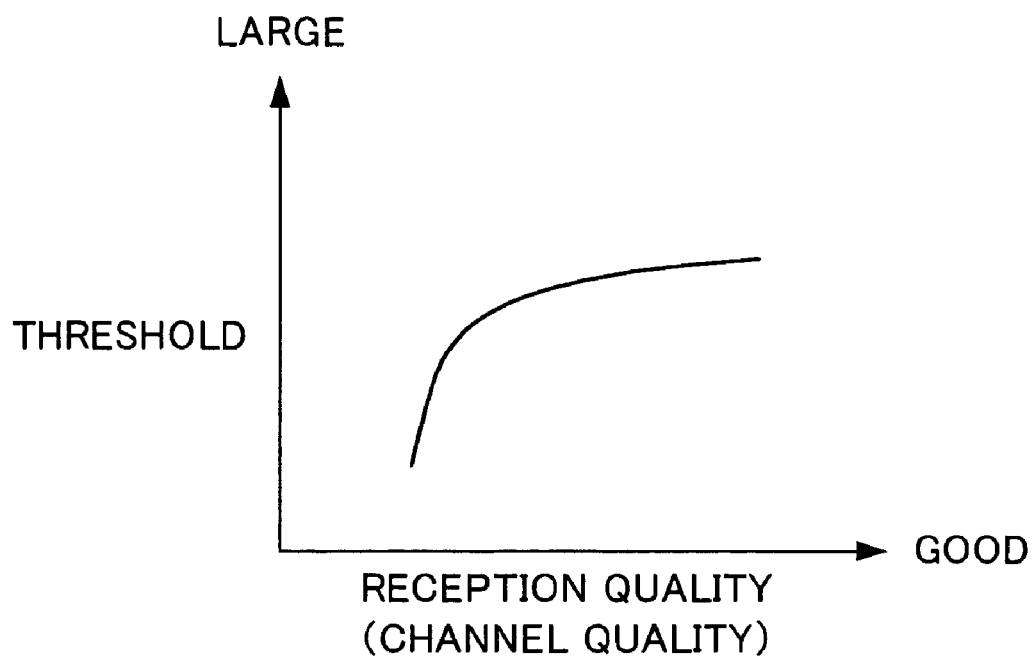
FIG. 9 is a characteristic curve for illustrating a threshold updating method according to the embodiment of the present invention.

The threshold generation section 232 prestores a table indicating the relationship between reception quality and a threshold and generates a threshold with reference to this table based on the supplied reception quality. FIG. 9 is a graph created based on the table indicating the correspondence between thresholds and reception levels used to generate thresholds at the threshold generation section 232. As shown in FIG. 9, when the reception quality (channel quality) of the threshold generation section 232 deteriorates, its threshold also becomes smaller. That is, when the reception quality is bad, the likelihood value becomes smaller compared to the case with high reception quality, no matter what modulation scheme is estimated, and therefore when the reception quality is bad, it is necessary to reduce a threshold with respect to the likelihood of the demodulation scheme set in the demodulation estimation section 212. By doing so, it is possible to prevent the decision rate in step ST205, step ST209 and step ST213 in the procedure for estimation processing of the demodulation scheme shown in FIG. 6 from deteriorating and reduce the probability that processing will be carried out as far as a comparison of likelihood in the final step ST216. This can reduce the amount of processing in the estimation processing of a demodulation scheme.

Figure 10:
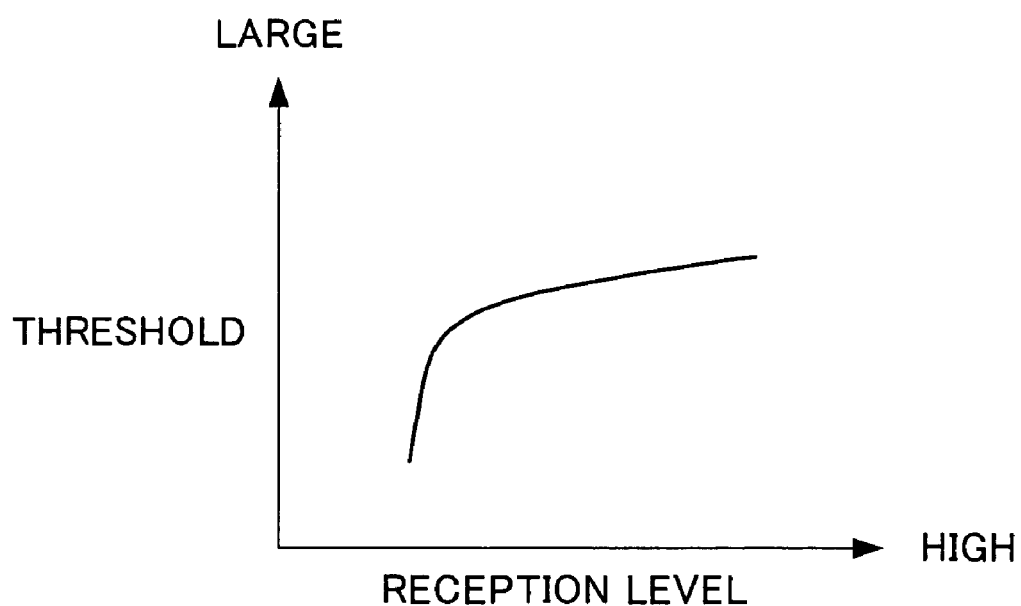
FIG. 10 is another characteristic curve for illustrating a threshold updating method according to the embodiment of the present invention.

FIG. 9 is a graph showing the relationship between a threshold and reception quality. When the reception level is used, it is likewise possible to prestore a table indicating the relationship between a threshold and reception level shown in FIG. 10 in the threshold generation section 232, generate a threshold using the reception level supplied from the reception level measuring section 204 and this table and thereby reduce the amount of processing in the estimation processing of the demodulation scheme.

In the above described configuration, when a modulation scheme on the transmitting apparatus side is estimated, the reception apparatus 200 uses a set of the demodulation estimation section 212, likelihood calculation section 213 and demodulation scheme decision section 215 to set demodulation schemes corresponding to a plurality of modulation schemes one by one and carries out estimation processing on the modulation schemes one by one. Compared to the conventional case where sets of circuits corresponding in number to modulation schemes to be estimated are provided, this allows the same estimation processing to be carried out on a substantially smaller hardware scale.

Then, by deciding priority order of the modulation schemes (demodulation schemes to be set in the modulation estimation section 212) based on the previously estimated demodulation scheme and previous reception quality (or reception level this time) during the estimation processing of the modulation scheme, it is possible to estimate demodulation schemes in descending order of probability. This eliminates the need to estimate all demodulation schemes to be estimated (without carrying out all the estimation processing shown in FIG. 6), and thereby increases the probability that results of estimation of demodulation schemes will be obtained more quickly.

Furthermore, when modulation schemes are estimated, it is possible to improve the decision accuracy by updating thresholds to be compared to likelihood for each demodulation scheme based on the reception quality or reception level. Improving the decision accuracy eliminates the need to estimate all demodulation schemes to be estimated (without carrying out all the estimation processing shown in FIG. 6) and thereby increases the probability that results of estimation of demodulation schemes will be obtained more quickly.

Thus, the reception apparatus 200 of this embodiment can suppress the amount of processing and power consumption of estimation processing to a maximum of approximately half that in the case of two modulation schemes (can further suppress in the case of three modulation schemes) when compared to the conventional apparatus while maintaining the decision accuracy of modulation schemes. Furthermore, carrying out processing in order of predicted modulation schemes makes it possible to share hardware which is independent of modulation schemes and thereby reduce the circuit scale.

The above described embodiments apply the present invention to a TDMA-based wireless transmission system, but the present invention is not limited to this and can also be applied to wireless transmission systems based on other systems.

As described above, the present invention adds priority order to demodulation schemes to be candidates for estimation processing of modulation schemes, carries out estimation processing on demodulation schemes in descending order of priority and confirms the demodulation scheme of the received signal when predetermined likelihood is obtained, and can thereby estimate the demodulation scheme of a received signal more easily and with a substantially smaller configuration.

The present invention is not limited to the above described embodiments, and various variations and modifications may be possible without departing from the scope of the present invention.

This application is based on the Japanese Patent Application No. 2002-314954 filed on Oct. 29, 2002, entire content of which is expressly incorporated by reference herein.

What is claimed is:

1. A reception method for a wireless communication system based on adaptively selecting one of a plurality of demodulation schemes according to variations in a propagation path characteristic, the method comprising:

adding a priority order to the plurality of demodulation schemes according to a reception quality or a reception level of a received signal;

estimating likelihoods of the plurality of demodulation schemes for the received signal individually in descending order of the priority until a predetermined likelihood is obtained, and confirming the demodulation scheme for which the predetermined likelihood is obtained as a demodulation scheme of the received signal, without estimating likelihoods of demodulation schemes having lower priority than the demodulation scheme for which the predetermined likelihood is obtained; and executing demodulation of the received signal using the confirmed demodulation scheme.

2. The reception method according to claim 1, wherein in adding a priority order, the priority order is determined based on a demodulation scheme previously estimated and reception quality of the received signal which is demodulated using the demodulation scheme previously estimated, or the demodulation scheme previously estimated and the reception level of the received signal.

3. The reception method according to claim 1, further comprising deciding a threshold to be compared with the predetermined likelihood based on the reception quality of the received signal, wherein in the estimating, the predetermined likelihood is compared with the decided threshold to estimate a demodulation scheme.

4. A reception apparatus for a wireless communication system based on adaptively selecting one of a plurality of demodulation schemes according to variations in a propagation path characteristic, the apparatus comprising:

a demodulation scheme estimator that demodulates a received signal using a predetermined demodulation scheme of the plurality of demodulation schemes, calculates a likelihood of the demodulated received signal and estimates whether or not the demodulation scheme is a demodulation scheme corresponding to the modulation scheme of the received signal, based on the calculated likelihood;

a demodulation scheme estimation controller that adds a priority order to the plurality of demodulation schemes according to reception quality or reception level of the received signal, causes the demodulation scheme estimator to estimate likelihoods of the plurality of demodulation schemes for the received signal individually in descending order of the priority until a predetermined likelihood is obtained, and confirms the demodulation scheme for which the predetermined likelihood is obtained as a demodulation scheme of the received signal, without estimating likelihoods of demodulation schemes having lower priority than the demodulation scheme for which the predetermined likelihood is obtained; and a demodulator that demodulates the received signal using the confirmed demodulation scheme.

5. A wireless communication system comprising:

a transmission apparatus that adaptively selects a modulation scheme corresponding to a transmission signal of a plurality of modulation schemes according to variations in a propagation path characteristic; and a reception apparatus that comprises:

a demodulation scheme estimator that demodulates a received signal using a predetermined demodulation scheme of a plurality of demodulation schemes, calculates a likelihood of the demodulated received signal and estimates whether or not the demodulation scheme is a demodulation scheme corresponding to the modulation scheme of the received signal, based on the calculated likelihood;

a demodulation scheme estimation controller that adds a priority order to the plurality of demodulation schemes according to reception quality or reception level of the received signal, causes the demodulation scheme estimator to estimate likelihoods of the plurality of demodulation schemes for the received signal individually in descending order of the priority until a predetermined likelihood is obtained, and confirms the demodulation scheme for which the predetermined likelihood is obtained as a demodulation scheme of the received signal, without estimating likelihoods of demodulation schemes having lower priority than the demodulation scheme for which the predetermined likelihood is obtained; and a demodulator that demodulates the received signal using the confirmed demodulation scheme.

* * * * *